Oct. 20, 1970 JAMES E. WEBB 3,535,658
ADMINISTRATOR OF THE NATIONAL AERONAUTICS
AND SPACE ADMINISTRATION
FREQUENCY TO ANALOG CONVERTER
Filed June 27, 1967 2 Sheets-Sheet 1

INVENTOR.
FRANK S. HAGIHARA

BY

ATTORNEYS

Oct. 20, 1970 JAMES E. WEBB 3,535,658
ADMINISTRATOR OF THE NATIONAL AERONAUTICS
AND SPACE ADMINISTRATION
FREQUENCY TO ANALOG CONVERTER
Filed June 27, 1967 2 Sheets-Sheet 2

INVENTOR.
FRANK S. HAGIHARA
BY
ATTORNEYS 3,535,658
Patented Oct. 20, 1970

3,535,658

FREQUENCY TO ANALOG CONVERTER

James E. Webb, Administrator of the National Aeronautics and Space Administration, with respect to an invention of Frank S. Hagihara, Salt Lake City, Utah Filed June 27, 1967, Ser. No. 649,357
Int. Cl. H03c *1/12;* H03k *17/28*
U.S. Cl. 332—31 5 Claims

ABSTRACT OF THE DISCLOSURE

A frequency to analog converter in which the input signals at a varying frequency are converted into two trains of pulses, each pulse in the first train having a delayed corresponding pulse in the second train. A unipolar field effect transistor (FET) is used to interconnect first and second capacitors. The first capacitor, which is the larger of the two, is charged at a uniform rate by a constant current source. The leading edge of each pulse in the first train switches the FET to an "on" state to provide a low resistance path between the capacitors, so that the second capacitor assumes the potential of the first capacitor. The trailing edge of the pulse in the first train switches the FET to the "off" state, to isolate the capacitors from one another, prior to the arrival of the leading edge of the corresponding pulse in the second train which activates a discharging gate to discharge the first capacitor. Thus, during each cycle of an input signal, the charge or potential of the second capacitor is directly related to the duration of a preceding cycle of the input signal.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; U.S.C. 2457).

BACKGROUND OF THE INVENTION

Field of the invention

This invention relates generally to a frequency to analog converter and, more particularly, to an improved converter capable of providing fast conversion reponse at low frequencies.

Description of the prior art

The basic function of a frequency to analog converter is to provide an analog output, generally a DC voltage, which varies as a function of the frequency of input signals. Several types of frequency to analog converters are known in the art, some being commercially available. Though some perform satisfactorily in certain instrumentation applications, their accuracy and response time to one cycle of input frequency are limited, especially at low frequencies. Such low frequencies are generally present in flow meter instrumentation at low flow rates. Thus, a need exists for a frequency to analog converter with fast response time and a high degree of accuracy at low frequencies.

OBJECTS AND SUMMARY OF THE INVENTION

It is therefore a primary object of this invention to provide a new frequency to analog converter which is not limited by disadvantages, characteristic of prior art converters.

Another object is to provide a new frequency to analog converter with fast response time down to low frequencies.

A further object of this invention is to provide a relatively simple frequency to analog converter in which an accurate analog output is provided with a response time of one cycle of the input frequency down to frequencies below 10 c.p.s.

These and other objects of the invention are achieved by providing a frequency to analog converter in which the input signals in the form of a train of alternating current (AC) signals of varying frequency are received and converted into first and second trains of pulses, varying in frequency as the input signals. The second train of pulses is delayed with respect to the first by a preselected time delay.

The frequency converter also includes a first capacitor, chargeable from a constant current network. A second capacitor smaller than the first is connected to the first capacitor through a first gating circuit, which is opened during each pulse of the first train, so that the potential of the second capacitor equals that of the first. When the first gating circuit is closed, it presents a very high impedance, isolating the capacitors from one another. The first capacitor is connected to a discharging gate, which is opened by each pulse in the second train. Thus, for each cycle of the input signal, the first capacitor is charged up to a potential which is linearly related to the cycle period. Then just before being discharged at the end of the cycle period, it transfers the potential to the second capacitor for use as the analog output signal.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
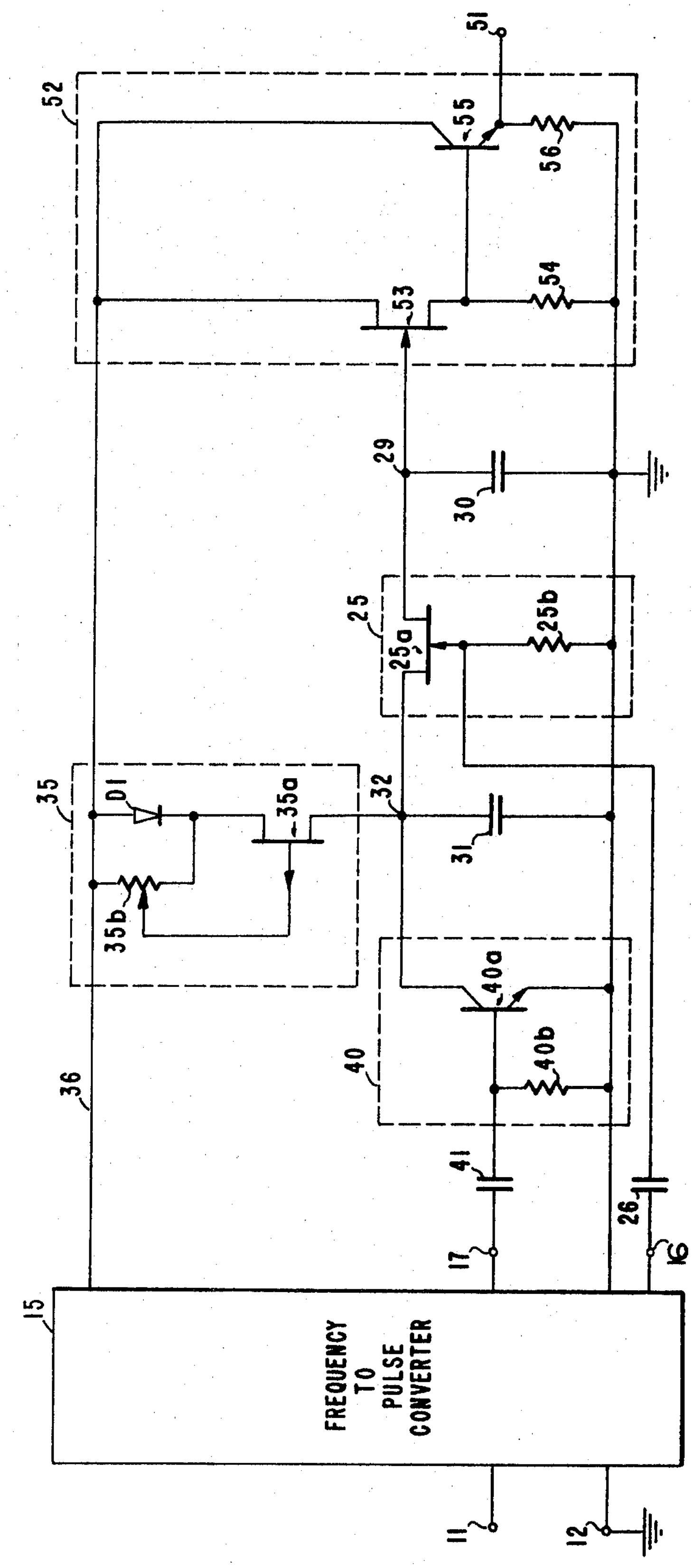
FIG. 1 is a combination block and schematic diagram of an embodiment of the invention.
Figure 2:
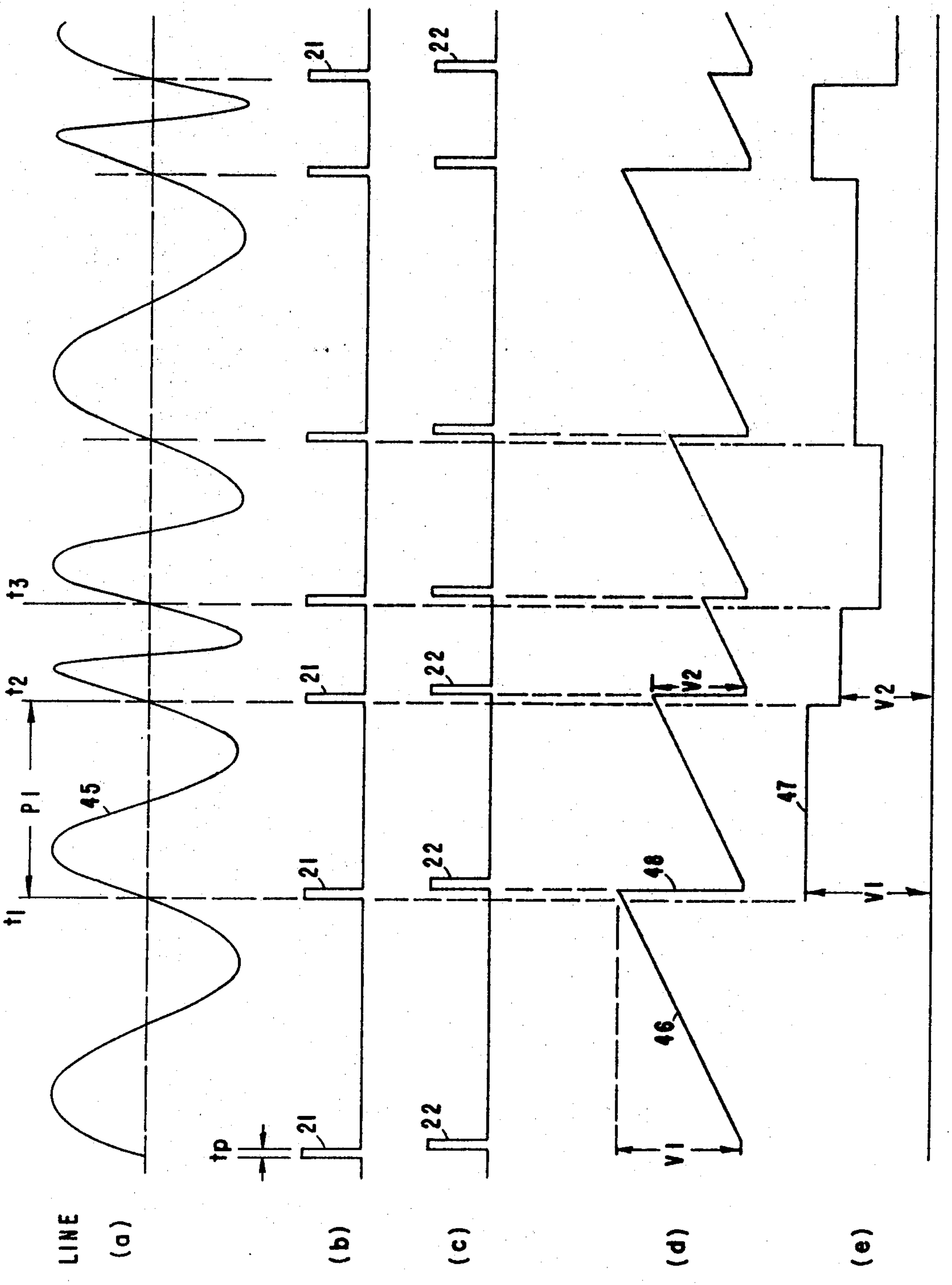
FIG. 2 is a multiline waveform diagram useful in explaining the invention.

Referring to FIG. 1, therein the converter of the invention is shown including input terminals 11 and 12 to which AC input signals are assumed to be supplied. By way of example, line *a* of FIG. 2 represents a train of input signals of varying frequency. The input signals may also vary in amplitude although such variations do not affect the converter of this invention. Terminal 12 may be connected to a reference potential such as ground to which other circuits and components are also connected so that all potential differences may be measured with respect to it.

The input terminals 11 and 12 are connected to a frequency to pulse converter 15 which provides at terminals 16 and 17, first and second trains of pulses respectively. The waveshape of the first train is diagrammed in line *b* of FIG. 2, while line *c* represents the waveshape of the second train at terminal 17. Briefly, in forming the first train of pulses, converter 15 generates a pulse 21 for each transition of the input signal from a reference level such as ground. Each pulse 21 is of equal duration *tp,* for example five microseconds. The periods between adjacent pulses 21 vary as a function of the frequency changes of the input signals. Alternately stated, the frequency of the first train of pulses 21 is the same as that of the input signals.

The second train of pulses 22 is identical to the first train except of selected delay between the two trains. Thus, each pulse 21 has a corresponding pulse 22 which follows it in time by the selected delay. It is significant that the delay be greater than the pulse duration *tp* so that the trailing edge of a pulse 21 precedes the leading edge of its corresponding pulse 22. In an exemplary embodiment, the delay was chosen to be ten microseconds and the pulse duration not less than five microseconds but less than ten microseconds. In FIG. 2, the durations or widths of the pulses have been exaggerated in order to diagram the leading and trailing edges thereof.

Each pulse 21 is applied to a gating circuit 25 through a blocking capacitor 26. The gating circuit consists of a unipolar field effect transitor (FET) 25*a*, whose base is connected through a resistor 25*b* to ground. The pulses 21 are applied to the base of the transistor 25*a* whose other two terminals are connected at a junction point 29 to a small capacitor 30 and to a much larger capacitor 31 at a junction point 32. The opposite ends of the two capacitors are connected to ground.

Junction point 32 is connected to a constant current network 35, designed to charge capacitor 31 at a constant rate. The network 35 is shown consisting of a field effect transistor (FET) 35*a*, a variable resistor 35*b* and a diode D1. The latter two elements are connected to a line 36, assumed to be connected to a positive source of potential. Variable resistor 35*b* is used to control the amount of charging current, while diode D1 serves to bias transistor 35*a*.

Junction point 32 also serves to connect a discharging gating circuit 40 to capacitor 31. The discharging gating circuit is shown consisting of a transistor 40*a* whose collector is connected to point 32, and an emitter connected to ground. The base of 40*a* is connected to terminal 17 through a blocking capacitor 41 and to ground through a resistor 40*b*.

Briefly, gating circuit 40 is driven to conduction during each pulse 22 to provide a low resistance discharge path for capacitor 31. Between pulses 22, capacitor 31 is charged by network 35 at a constant rate, resulting in a linear sawtooth voltage waveform at junction point 32. Such a waveform is diagrammed in line *d* of FIG. 2. It should be noted that the peak voltage that each sawtooth attains is directly proportional to the period of the input signal.

Like pulses 22 used to activate gating circuit 40, pulses 21 are used to activate gating circuit 25, whose unipolar FET 25*a* is switched to conduction or turned "on" during the duration of each pulse 21. During the "on" period, the resistance across FET 25*a* is quite low, for example about 600 ohms. The capacitance of capacitor 30 is much less than that of capacitor 31, so that when FET 25*a* is turned "on," the potential at point 29 will equal that of capacitor 31 at point 32, independent of polarity. Also, by selecting capacitor 30 to be much smaller than 31, the loading effect on capacitor 31 is reduced and the potential equalization time is lowered to a minimum, for example one microsecond. In the absence of a pulse 21, the FET 25*a* is in a nonconductive or "off" state, providing a very high resistance, for example 150 megohms, between the two capacitors 30 and 31 and therefore effectively isolating them from one another. Consequently, when a pulse 22 causes the discharge of capacitor 31, it does not affect the potential of capacitor 30 at point 29.

In operation, the leading edge of pulse 21, preceding its corresponding pulse 22, turns FET 25*a* "on" so that capacitor 30 assumes the potential of capacitor 31. The trailing edge of pulse 21 turns the FET 25*a* "off," isolating the capacitors from one another. Then, pulse 22 causes capacitor 31 to discharge. However, due to the high impedance of FET 25*a* in the "off" state, the potential of capacitor 30 is not affected until a succeeding pulse 21. It should be noted that since FET 25*a* is turned "on" at approximately the time when the voltage of capacitor 31 reaches a peak, i.e. just before the discharging pulse 22, capacitor 30 is practically charged to the peak potential for each input signal. The changes in the potential of capacitor 30 at point 29 are diagrammed in line *e* of FIG. 2.

The operation of the converter may be summarized with an exemplary cycle of operation, best explained by again referring to FIG. 2. Let it be assumed that the beginning and end of an input signal 45 (line *a*) of a period P1 occur at times $t_1$ and $t_2$, at which time two pulses 21 are produced as part of the first train of pulses (line *b*). Also, a delayed pulse 22 corresponding to each pulse 21 is provided as part of the second train of pulses (line *c*). The first pulse 21 at $t_1$ activates FET 25*a* to transfer the charge or potential of capacitor 31 as represented by the sloping line 46 (line *d*) with a peak potential V1 to capacitor 30. This transfer is represented by line 47 in line *e* of FIG. 2. Then the trailing edge of the first pulse 21 deactivates FET 25*a*, isolating capacitor 30 from 31, so that when the corresponding pulse 22 causes the discharge of capacitor 31 as indicated by line 48, the charge of capacitor 30 remains unaltered. The pulse 21 at $t_2$ again activates FET 25*a* to transfer the peak potential V2 of capacitor 31 to capacitor 30.

From the foregoing, it should be noted that during each input signal, the peak potential reached by capacitor 31, i.e. the peak sawtooth voltage, depends on the signal's period. However, the potential of capacitor 30 during such period actually represents the period of a preceding input signal. Thus, between $t_1$ and $t_2$, the potential of capacitor 30, i.e. V1 represents the period of the input signal prior to $t_1$, while the potential representing the period P1 of input signal 45 is stored by capacitor 30 during the period of a succeeding input signal between times $t_2$ and $t_3$. Consequently, a response time of one cycle of input signal is achieved, with the output potential at point 29 varying in response to the period or frequency of each input signal.

By minimizing the duration of the pulses, the time delay therebetween and in particular, the time difference between the trailing edge of each pulse 21 and the leading edge of its corresponding pulse 22, the ripple factor may be held to not more than 1% of the readout potential. Furthermore, because of the particular potential transfer feature of the converter and the high impedance isolation provided by FET 25*a* when its is in the "off" state, the converter of the present invention is satisfactorily operable down to very low frequencies, for example below 10 c.p.s. It is apparent that the upper frequency limit is dependent on the desired readout accuracy and the width of pulses 21 and 22, which in turn controls the minimum time delay therebetween.

In most instrumentation applications, it is desired to provide the output from a low output impedance. This may be accomplished in the present invention by connecting junction point 29 to an output terminal 51 through a low output impedance network 52. It is shown consisting of a FET 53 having a high input impedance in the order of 10,000 megohms, whose source electrode is connected to ground through a resistor 54 and to the base of a transistor 55. Transistor 55 is connected to ground through a resistor 56 in a common emitter configuration, providing an output impedance of approximately 200 ohms.

In one embodiment of the invention actually reduced to practice, with the various components of the types and values as listed for examplary purposes in the following list, the output voltage varied from 20 volts at 1 c.p.s. to approximately 5 millivolts at 5000 c.p.s.

LIST OF COMPONENTS

Transistors:

| | |
|---|---|
| 25*a* | Unipolar FET 2087 |
| 35*a* | FET 2N2843 |
| 40*a* | NPN 2N1650 |
| 53 | FET 3087 |
| 55 | NPN 2N656A |
| Diode D1 | 1N645 |

LIST OF COMPONENTS—Continued

| | |
|---|---|
| Capacitors: | |
| 26 | 0.1 microfarad |
| 30 | 50 picofarads |
| 31 | 0.1 microfarad |
| 41 | 0.1 microfarad |
| Resistors: | |
| 25*b* | 100K ohms |
| 35*b* | 10K ohms |
| 40*b* | 2.2K ohms |
| 54 | 30K ohms |
| 56 | 2.0K ohms |

Figure 3:
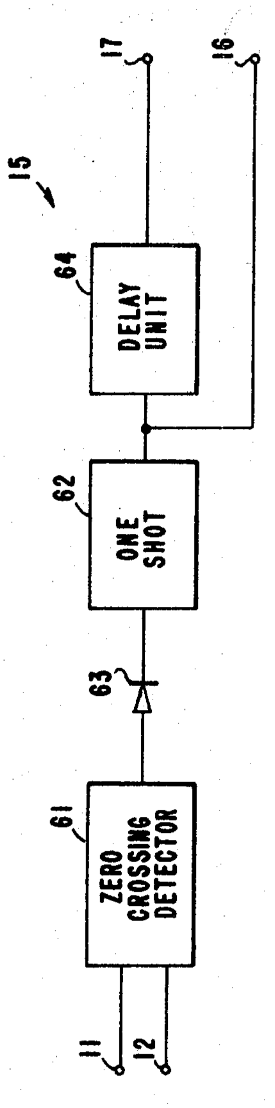
FIG. 3 is a schematic diagram of a frequency to pulse converter, shown in FIG. 1 in block form.

The list of components is presented as exemplary of the invention rather than as a limitation thereon, since it should be appreciated that different components may be used in practicing the teachings of the invention. Similarly, it should be appreciated that various known circuit arrangements may be employed in constructing the frequency to pulse converter 15 which provides the trains of pulses 21 and 22. However, for explanatory purposes, one exemplary arrangement is diagrammed in FIG. 3, to which reference is made herein.

Therein, the converter 15 is shown consisting of a zero crossing detector 61 connected to receive the input signals at terminals 11 and 12. The detector 61 which may be thought of as a squaring circuit, is connected to a one shot 62 through a diode 63. Thus, for each positive transition of the input from zero, a pulse such as 21 is provided by the one shot, which is directly connected to terminal 16 and through a delay unit 64 to terminal 17.

There has accordingly been shown and described herein a novel frequency to analog converter. It should be appreciated that those familiar with the art may make modifications in the arrangements as shown without departing from the spirit of the invention. Therefore, all such modifications and/or equivalents are deemed to fall within the scope of the invention as claimed in the appended claims.

What is claimed is:

1. A frequency to analog converter for converting received input signals of varying frequencies to analog output signals comprising:

input means to which said input signals are applied for providing a first train of pulses and a delayed second train of pulses, the spacings between adjacent pulses in each train corresponding to the changes in the periods of adjacent input signals, the leading edge of each pulse in said second train of pulses trailing the trailing edge of a corresponding pulse in said first train of pulses by a time duration which is greater than zero;

first chargeable means;

second chargeable means;

first gating means, having on and off states, connected to and between said first and second chargeable means;

a charging network for charging said first chargeable means at a uniform constant rate;

means for applying each pulse in said first train to said first gating means to switch it to said on state for the duration of the pulse, whereby said second chargeable means is chargeable to the potential of said first chargeable means only when said first gating means is in the on state; and discharge means connected to said first chargeable means and responsive to each pulse in said second train for discharging the first chargeable means to a reference potential during the duration of the pulse in said second train.

2. The frequency to analog converter as recited in claim 1 wherein said first gating means comprises a unipolar field effect transistor which in its on state provides a relatively low resistance thereacross, whereby said second chargeable means is chargeable to the potential of said first chargeable means during the duration of each pulse in said first train, said first gating means in said off state providing high resistance between said first and second chargeable means to substantially isolate one from the other.

3. The frequency to analog converter as recited in claim 2 wherein said first and second chargeable means are first and second capacitors, the capacitance of the first capacitor being substantially larger than that of the second capacitor, whereby when said first gating means is in the on state, the second capacitor is charged to the potential of the first capacitor without affecting the potential of said first capacitor.

4. The frequency to analog converter as recited in claim 3 wherein the leading edge of each pulse in said second train lags the trailing edge of a corresponding pulse in the first train by a duration of about several microseconds.

5. A frequency to analog converter comprising:

frequency to pulse converting means to which input signals of varying frequencies are applied for providing first and second trains of pulses of equal durations, the spacings between adjacent pulses in each train corresponding to the changes in the periods of adjacent input signals, said second train being delayed with respect to said first train so that the trailing edge of each pulse in said first train precedes by a fixed preselected interval the leading edge of a corresponding pulse in the second train;

first and second capacitors;

charging means connected to said first capacitor to charge it at a uniform constant rate;

first gating means comprising a unipolar field effect transistor connected between said first and second capacitors and responsive to each pulse in said first train for providing a low impedance in the range of 1000 ohms thereacross during the duration of each pulse and a high impedance of at least 100 ohms in the absence of a pulse in the first train; and second gating means connected to said first capacitor and responsive to each pulse in said second train of pulses for discharging said second capacitor during the duration of each pulse in said train, the capacitance of said first capacitor being much larger than that of the second capacitor, and the duration of each pulse in said first train being selected so that the potential of said first capacitor is transferred to said second capacitor during the duration of said pulse in said first train without affecting the potential of said first capacitor.

References Cited

UNITED STATES PATENTS

| | | | |
|---|---|---|---|
| 3,072,854 | 1/1963 | Case | 332—9 X |
| 3,202,834 | 8/1965 | Pingry et al. | 307—233 |
| 3,274,500 | 9/1966 | Bengston | 328—140 X |
| 3,314,014 | 4/1967 | Perkins | 328—151 X |
| 3,333,109 | 7/1967 | Updike | 328—151 X |
| 3,414,737 | 12/1968 | Bowers | 307—246 X |

ALFRED L. BRODY, Primary Examiner

U.S. Cl. X.R.

307—233, 246, 279; 328—140, 151; 332—41